May 26, 1953     K. C. CRUMRINE     2,640,097
PRECISION SWITCHING ASSEMBLY FOR ELECTRICAL PROSPECTING
Filed Oct. 21, 1949     4 Sheets-Sheet 1
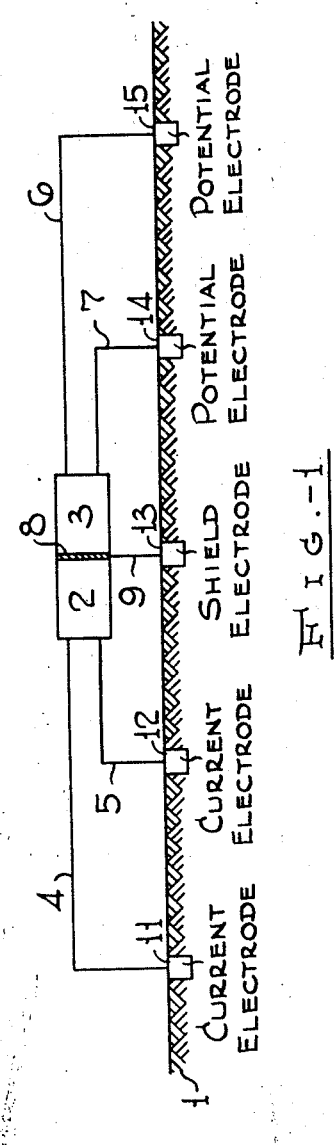
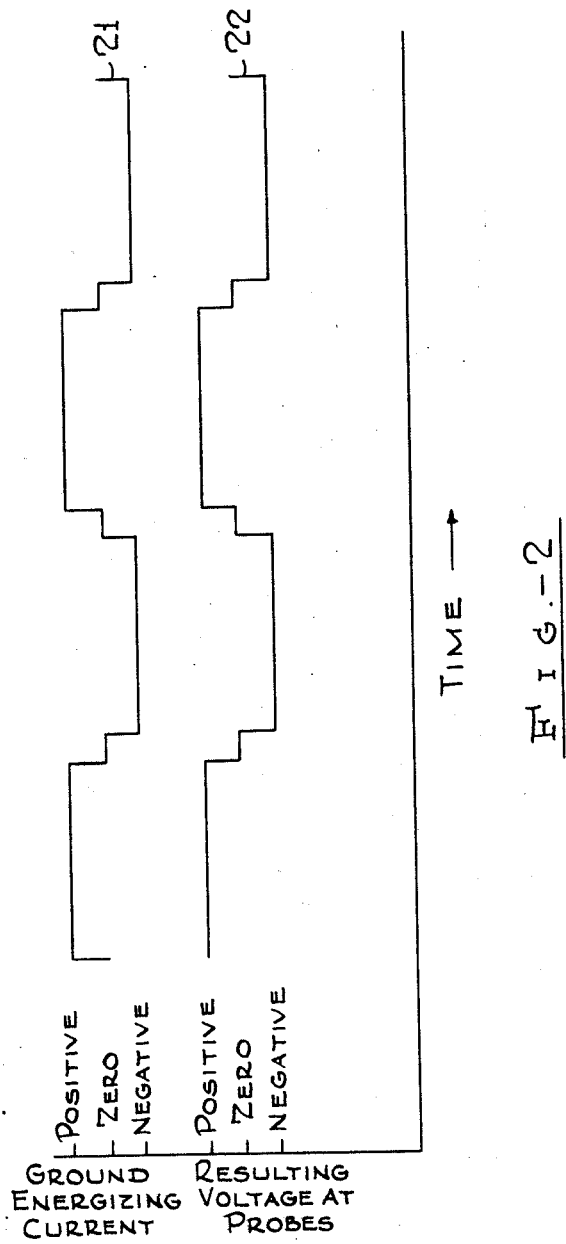
Kenneth C. Crumrine Inventor
By W. O. Heilman Attorney

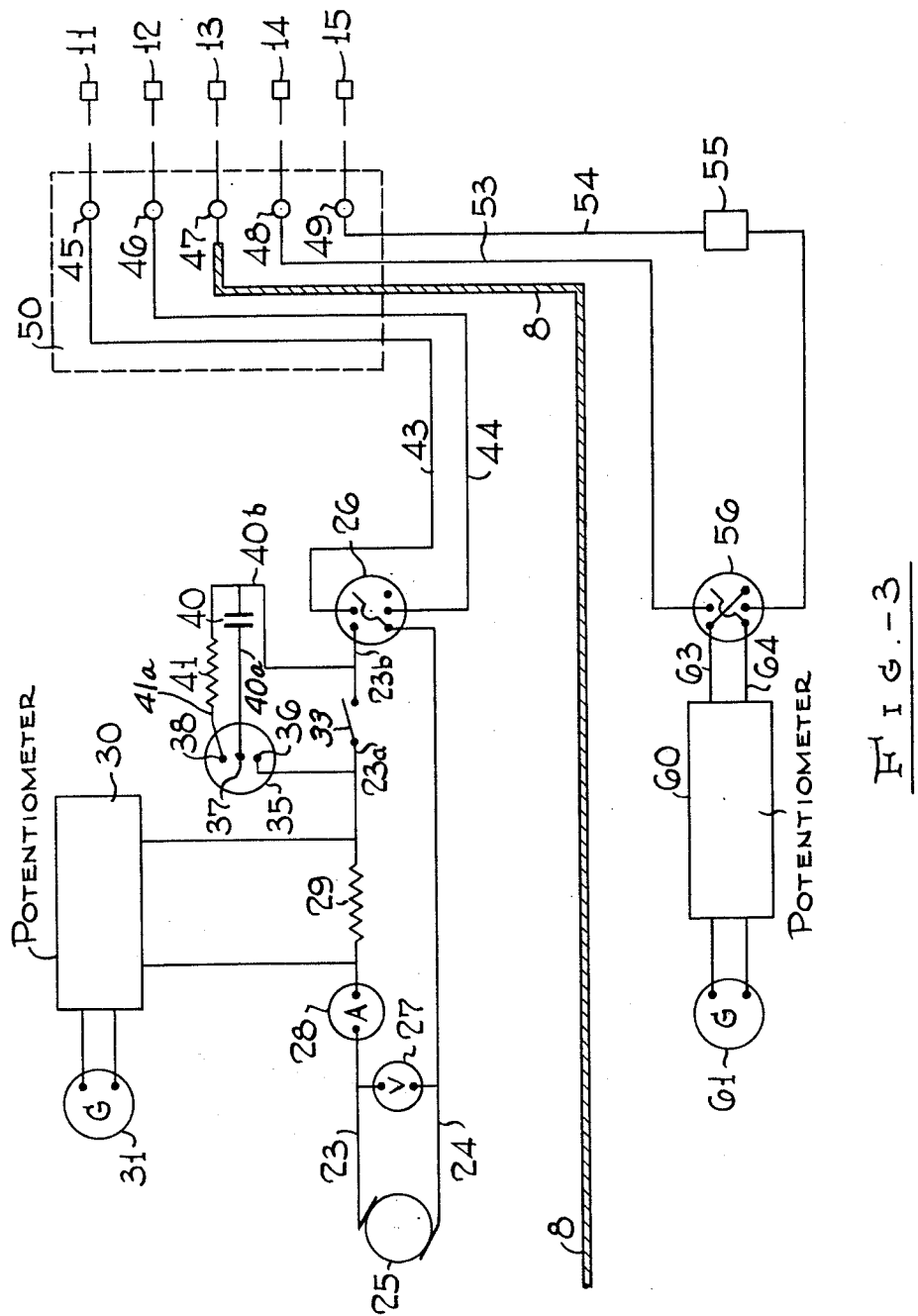

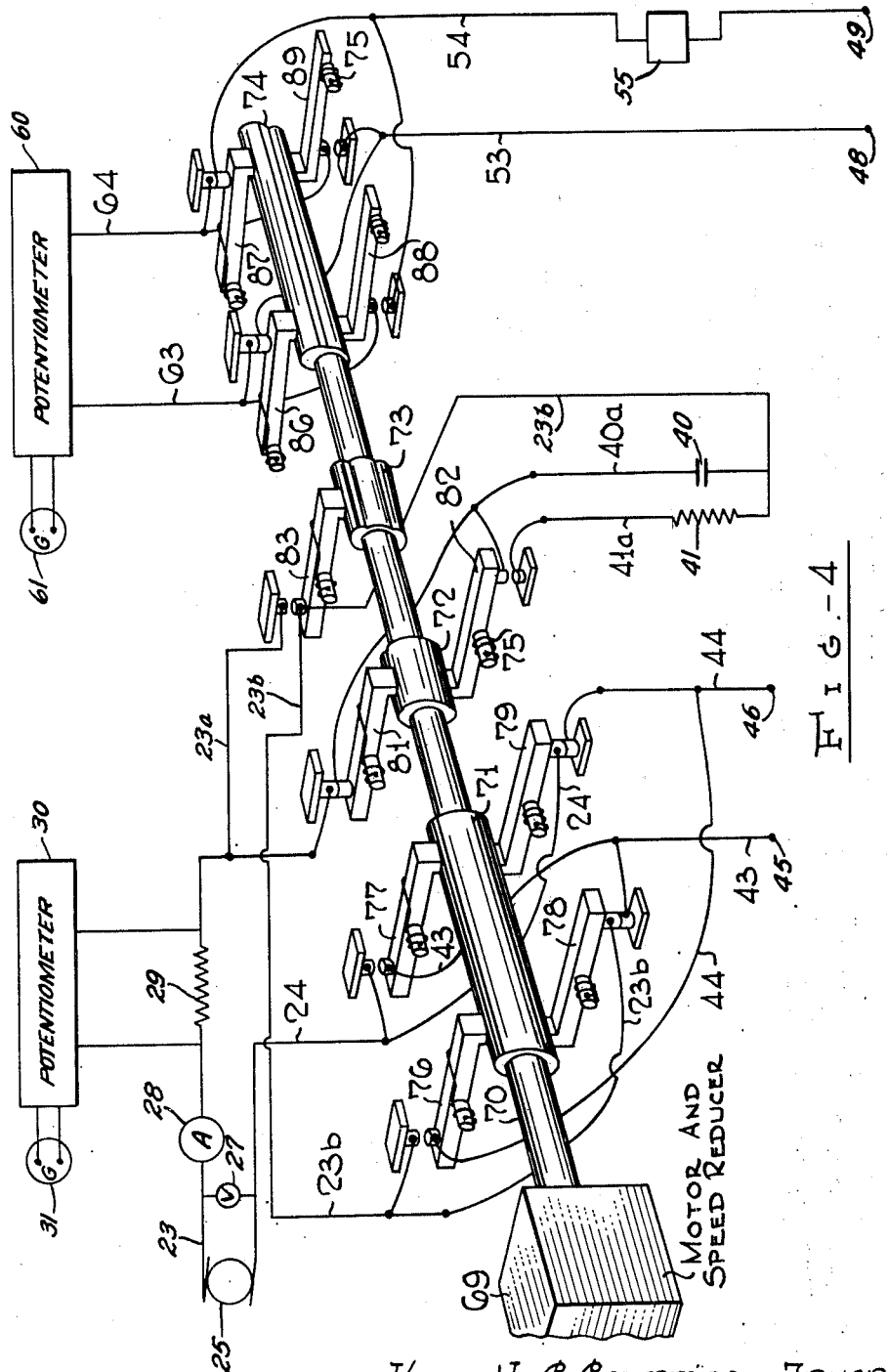

Patented May 26, 1953

2,640,097

UNITED STATES PATENT OFFICE 2,640,097

PRECISION SWITCHING ASSEMBLY FOR ELECTRICAL PROSPECTING

Kenneth C. Crumrine, Tulsa, Okla., assignor to Standard Oil Development Company, a corporation of Delaware Application October 21, 1949, Serial No. 122,632

1 Claim. (Cl. 175—182)

The present invention is broadly concerned with an improved apparatus for electrical prospecting and more particularly with a precision switching assembly for making and breaking the current circuit in electrical prospecting procedures.

One of the many methods that have been devised for determining geological anomalies in the earth formations below the earth's surface from which inferences may be drawn as to the probable presence of oil or other minerals is that known as electrical prospecting. Briefly, a well known electrical prospecting method consists in passing an electrical current of known magnitude through two electrodes set into the ground and spaced from each other in the ground, the two current electrodes and the two potential electrodes being usually, although not necessarily, set out along a straight line. The apparent ground resistivity in the vicinity of the electrode pattern can then be calculated from the potential difference measurement, taking into account the amount of current fed to the current electrodes, the electrode pattern and the spacing of the several electrodes. Then by varying the spacing between the several electrodes and taking additional measurements, it is possible to plot a graph of variation of electrode spacing with the calculated apparent resistivities and to infer from the data the probable presence or absence of ore deposits or of formations likely to yield crude oil or natural gas.

Although either alternating or direct current may be used in electrical prospecting, direct current is more desirable. However, use of direct current leads to sources of error due to polarization caused by the electrolytic action occurring in the vicinity of the ground electrode. Although nonpolarizing electrodes are available, experience has shown that more satisfactory results are obtained by employing a commutating device so that the direction of direct current flow through the current electrodes will be reversed periodically. This procedure has the further advantage of minimizing or eliminating fluctuations in potential measurements caused by natural earth currents. By providing two commutators on a common shaft, one to reverse the direction of current flow to the current electrodes and the other to reverse simultaneously the connections from the potential electrodes to the potentiometer or other measuring device it is possible to measure current and voltage by ordinary direct current methods just as if a simple direct current were applied to the ground, but the current in the ground is reversed in direction with each half revolution of the commutator shaft so that in effect an alternating current is applied from a direct current source. Normally when using this system the commutator shaft is rotated at about 1 to 10 R. P. S. so that an alternating current of about 1 to 10 cycles per second is introduced into the ground.

One difficulty that arises in employing an electrical prospecting method wherein commutators are used for simultaneously reversing the direction of current flow to the current electrodes and the connections to the potential measuring electrodes is that when large currents are employed, arcing of the current when the switch contacts are opened causes the latter to wear excessively so that the making and breaking of the power circuit soon tends to get out of phase with the other switching events in the mechanical commutator.

Thus it is a particular object of the present invention to provide means for protecting the current make-and-break switches in electrical prospecting and similar service to avoid excessive arcing and wear of the contact points. It is a further object of the invention to provide means for maintaining the precision of current make-and-break switching events and to maintain their proper phase relationship with other switching events in an electrical prospecting method. Other and further objects of the invention will be apparent from the ensuing description and from the drawings, in which:

Figure 1 is a block diagram showing a generalized method of measuring the apparent resistivity of the earth;

Figure 2 is a graphical representation of the electrical waves introduced into the ground by the ground energizing current and of the corresponding potential waves detected at potential electrodes in the ground during electrical prospecting.

Figure 3 is a diagram of the electrical circuits used in the electrical prospecting method of this invention.

Figure 4 is a schematic diagram of the cam-operated commutator of the present invention together with accompanying electrical circuits shown in Fig. 3.

Figure 5:
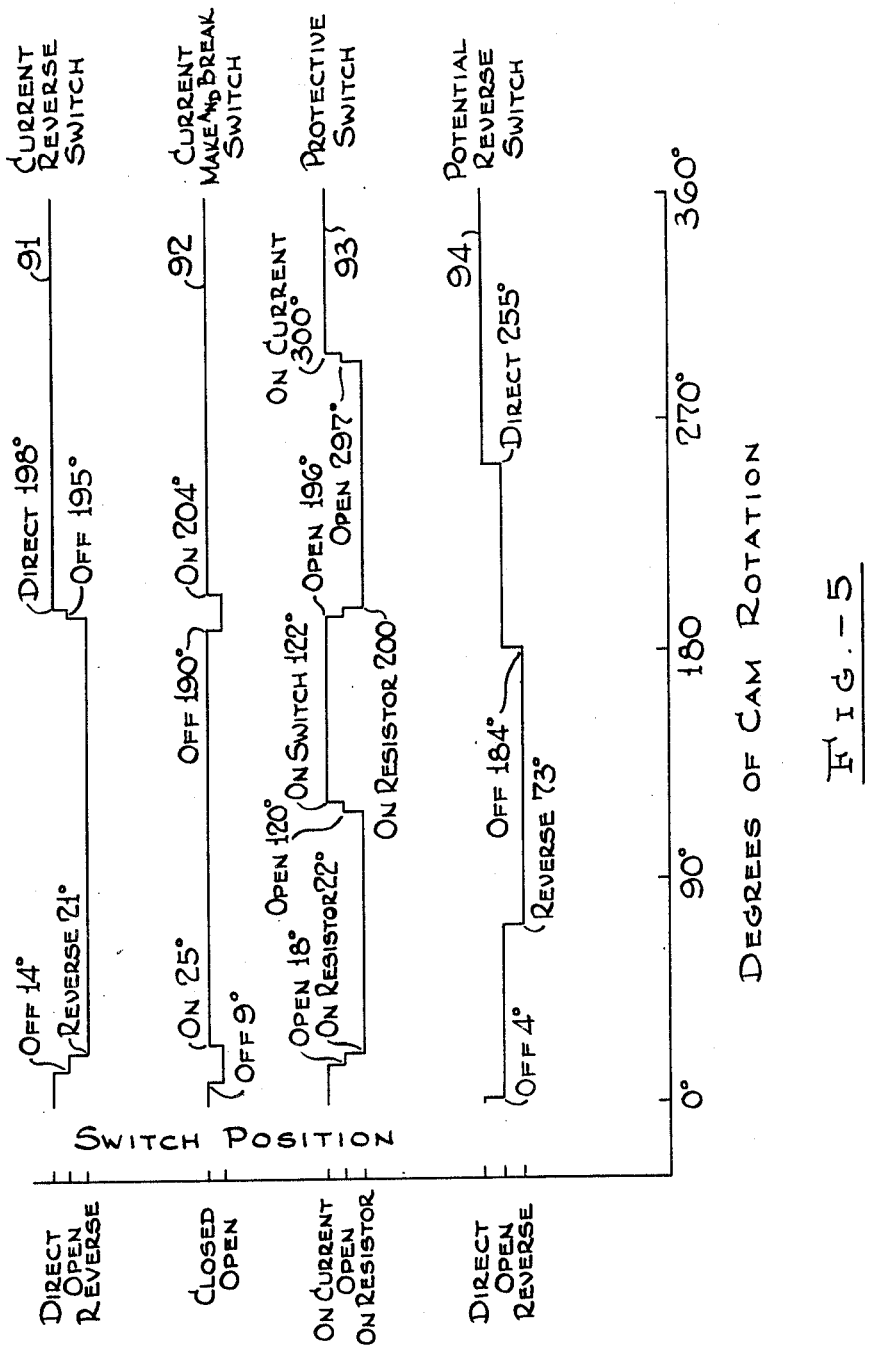
Figure 5 is a diagram of the time sequence of switching operations employed in practicing this invention.

Referring specifically to Figure 1, it will be seen that at least five electrodes are placed in the ground, a portion of which is represented by numeral 1. Current is fed into the ground from energizing source 2 through cables 4 and 5 by means of electrodes 11 and 12. The resulting potential difference is detected at electrodes 14 and 15 and transmitted to probe circuit 3 through cables 6 and 7. The energizing source 2 and the probe circuit 3 are separated from each other by means of a metallic shield 8, connected to shield electrode 13 by means of cable 9, the shield acting to prevent erratic leakage currents from reaching the probe circuit.

It is to be understood, of course, that other electrode patterns may be chosen. For example, electrodes 11 and 15 may be the current electrodes and 12 and 14 the potential electrodes. Spacing of the electrodes depends on a number of factors and may be anywhere in the range of about 25 to 2500 feet. Spacings of about 800 to 1000 feet are frequently used.

By means of a commutating device described more fully hereinafter in connection with Figures 3 and 4, the ground energizing current fed to electrodes 11 and 12 is periodically reversed in direction and at the same time the potential difference obtained at electrodes 14 and 15 is rectified by a reversing switch operated by the commutating device in synchronism with the current reversing switch.

The periodic reversal of current direction at electrodes 11 and 12 produces a square wave form in the ground energizing current as shown by line 21 in Figure 2 which is a graphical representation of ground energizing current and of potential difference at the probe electrodes plotted against time. This ground energizing current of square wave form produces an alternating potential difference between electrodes 14 and 15 of the wave form shown by line 22. It is apparent that the aforementioned synchronization of the current reversing switch and the potential reversing switch must be maintained in order to ensure accurate results and that wear or arcing of the current switch will tend to throw the current and potential switching out of phase. Hence the need for the improved device of the present invention.

In Figure 3 is presented a diagram of an electrical circuit employing the present invention. Current is furnished by D. C. generator 25 and fed to a current reversing switch 26 through leads 23 and 24. Voltage of the current obtained from generator 25 is determined with voltmeter 27 and the amount of current flowing is roughly determined with ammeter 28. An accurate determination of the current is made by placing resistor 29 in the line and measuring the voltage drop across it by means of potentiometer 30 and galvanometer 31, the resistance value of resistor 29 being known exactly. For example, a 0.16 ohm resistor may be used.

Also placed in the circuit between generator 25 and current reversing switch 26 is a current make-and-break switch 33 across the terminals of which is shunted a protective switch 35 which forms an essential feature of this invention. Switch 35 has the contact points 36, 37 and 38, point 36 being tied to one terminal of make-and-break switch 33, point 37 being tied to the other terminal of switch 33 through condenser 40 and point 38 being tied to latter terminal through resistor 41. The output from current reversing switch 26 is connected to terminals 45 and 46 on switchboard 50.

The potential measuring section of the electrical prospecting circuit is separated from the current section by means of shield 8 which is connected to terminal 47 of switchboard 50. The potential measuring means comprises a potentiometer 60 and galvanometer 61 which are fed by leads 53 and 54 through potential reversing switch 56, leads 53 and 54 being tied to terminals 48 and 49 on switchboard 50. Inserted in series with lead 54 is a source of D. C. voltage 55, referred to as a "bucking voltage" whose function is to neutralize natural earth and polarization potentials which would otherwise prevent a proper reading of the potential difference across the potential electrodes. Voltage source 55 may conveniently comprise two or three dry cells in a voltage divider circuit provided with a reversing switch so that the proper voltage of the proper polarity may be provided for the particular conditions existing for each location of the electrodes.

The purpose of switchboard 50 is to enable the operator to select any two of the five electrodes placed in the ground, as described in conjunction with Figure 1, as current electrodes and any two of the remaining electrodes as potential electrodes, the fifth electrode then being connected to the shield 8.

For convenience in relating Figure 3 to Figure 1 electrodes 11 and 12 are shown as current electrodes, i. e. they are connected to terminals 45 and 46 on switchboard 50, electrodes 14 and 15 are shown as potential electrodes and electrode 13 is connected to shield 8 through terminal 47 on switchboard 50.

As described below in connection with Figures 4 and 5, current reversing switch 26, potential reversing switch 56, current make-and-break switch 33 and protective switch 35 are operated in the proper sequence by means of cams mounted on a common shaft.

An important feature of the present invention is that in the sequence of switching events contacts 36 and 37 of switch 35 are brought together before switch 33 opens, current reversing switch 26 is actuated while switch 33 is open and contact between points 36 and 37 is broken and contact between points 37 and 38 is made while switch 33 is still open so that condenser 40 will be discharged through resistor 41 before condenser 40 is again shunted across switch 33. The sequence of switching operations and the manner of performing them will be more fully understood from Figures 4 and 5.

The commutator device for actuating the various switches in their proper sequence is shown schematically in Figure 4. A plurality of cams 71, 72, 73, 74 are mounted on a shaft 70 adapted to be rotated at a desired speed by means of motor and speed reducer unit 69. Conveniently a D. C. motor adapted to run at speeds of 200 to 2000 R. P. M. may be employed in conjunction with a speed reducing gear box having a reduction ratio of 10 to 1. Thus, if it is desired to have shaft 70 rotate at a speed of 2 revolutions per second, a motor speed of 1200 R. P. M. will be used.

Cam 71 is employed to actuate current reversing switch 26 of Figure 3, which comprises four contact switches 76, 77, 78 and 79, the former two acting simultaneously and the latter two simultaneously. With switches 76 and 77 open and switches 78 and 79 closed, electrical contact is made between lead 23b and lead 43 and between lead 24 and lead 44. It will be seen that with switches 76 and 77 closed and switches 78 and 79 open the connections will be reversed. Each switch is provided with a spring 75 which urges the switch arm to follow the cam with which it is associated.

In like manner switches 86, 87, 88 and 89 comprise the elements of potential reversing switch 56 of Figure 3 and are adapted to connect lead 53 to lead 63 and lead 54 to lead 64 or vice versa depending on the position of cam 74. Switch 83 constitutes a mechanical embodiment of current make-and-break switch 33 of Figure 3 and is adapted to connect and disconnect lead 23a and lead 23b, depending on the rotative position of cam 73.

Protective switch 35 of Figure 3 is represented in Figure 4 by contact switches 81 and 82, actuated by cam 72. When switch 81 is closed lead 40a is connected to lead 23a, so that, with reference to Figure 3, condenser 40 is cut in across current make-and-break switch 33. When switch 81 is open and switch 82 closed, lead 40a is connected to lead 41a, thus shorting condenser 40 across resistor 41.

The sequence of operations of the several switches in terms of angular rotation of cam shaft 70 is shown graphically in Figure 5, one complete rotation of the cam shaft being shown, with the zero degree position chosen arbitrarily. The individual angular values given are not particularly critical, although it is essential that they be so chosen that the current reversing action occurs during the current break and that protective condenser 40 is across the terminals of switch 33 before the break in current is made and is disconnected from at least one terminal of switch 33 before switch 33 is again closed. Furthermore, condenser 40 must be discharged before it is again connected across the terminals of switch 33.

In Figure 5 line 91 represents graphically the direct, open and reverse positions of current reverse switch 26 with respect to the rotational position of cam shaft 70. Similarly, line 92 represents the closed and open positions of current make-and-break switch 33, and line 94 the direct, open and reverse positions of potential reversing switch 56. Line 93 is a graphical representation of the "on current," open and "on resistor" positions of protective switch 35 with respect to degrees of cam rotation, the "on current" position being that in which condenser 40 is connected across switch 33 and the "on resistor" position being that in which condenser 40 is shunted across resistor 41.

It will be seen from Figure 5 that after switch 33 has been opened at, say, 9° and before it closes again at, say, 25° of cam shaft rotation, the following sequence of switching steps occur: (1) current reversing switch 26 opens, i. e., switches 78 and 79 open; (2) condenser 40 is disconnected from across switch 33, i. e., switch 81 opens; (3) current reverse switch 26 assumes its reverse position, i. e., switches 76 and 77 close; (4) condenser 40 is shunted across resistor 41, i. e., switch 82 closes. Other sequences of switch operation can be readily ascertained from Figure 5, the angular position of cam shaft rotation for each switching operation being indicated on each of the graphs. It will be noted that potential reversing switch 56 is off during each opening and closing of current make and break switch 33 and that furthermore it is on either "reverse" or "direct" during only the latter portion of the period that current reverse switch 26 is on "reverse" or "direct," respectively, which ensures accurate reading of potentials with minimum interference from transient currents.

The size of capacitor and of resistor used in the circuit of this invention will, of course, depend on the amount of power handled. For example, for handling 10 to 15 amperes at 220–230 volts, a condenser of 60 to 80 mfd. capacity may be used, and a 40 ohm resistor employed for discharging the condenser.

In a test in which the circuit of this invention was used to make and break a load of 11 amperes at 225 volts and in which a 63 mfd. condenser and a 40 ohm resistor were employed, the commutator producing an alternating current of 5 C. P. S., the silver anode and tungsten cathode contacts of the current make-and-break switch showed practically no wear after 60 hours of continuous testing, which is equivalent to about 12 weeks of normal service in electrical prospecting. Similar contacts, not protected, became inoperative in a like test before 10 breaks had occurred (about 2 seconds of operating time).

What is claimed is:

An improved switching assembly adapted to reverse the direction of current flow periodically comprising: a source of direct current, a power-driven camshaft, a plurality of cams carried by said shaft, a current make-and-break switch actuated by one of said cams, a first pair of contact switches actuated alternately by a second of said cams in such manner that each of said switches opens before the other one closes, a resistor, a capacitor, a first conducting means connecting one side of said resistor and one side of said capacitor to one terminal of said current make-and-break switch, a second conducting means connecting the second side of said resistor through one of said pair of contact switches to the second side of said capacitor, and a third conducting means connecting the second side of said capacitor to the second terminal of said current make-and-break switch through the second of said pair of contact switches, a second pair and a third pair of switches actuated by a third cam in such a manner that each of said pairs of switches opens simultaneously before the other of said pairs closes, a fourth pair and a fifth pair of switches actuated by a fourth cam in the same manner as defined with respect to said second and third pairs of switches, entering conductor leads and exit conductor leads connected to the contact points of said second and third pairs of switches in a manner that reverses the polarity of the current in said exit leads with respect to said entering leads upon the opening of one and the closing of the other of said second and third pairs of switches, said current make-and-break switch being placed in series with one of said entering leads, each of said entering conductor leads being connected to a terminal of said current source, and entering and exit potential leads connected to the contact points of said fourth and fifth pairs of switches in a manner that reverses the polarity of the exit leads with respect to the entering leads upon the opening of one and the closing of the other of said fourth and fifth pairs of switches, said cams being arranged on said camshaft in such relation that: upon rotation of said camshaft said current make-and-break switch will be open before said second contact switch is opened and said first contact switch is closed, said current make-and-break switch will close before said first contact switch is opened and said second contact switch is closed, said second contact switch will close before said current make-and-break switch is again opened, said opening and closing of said second and third pairs of switches occurs only while said current make-and-break switch is open, said fourth pair of switches are closed only during the latter portion of the period that said second pair of switches are closed and that said fifth pair of switches are closed only during the latter portion of the period that said third pair of switches are closed.

KENNETH C. CRUMRINE.

References Cited in the file of this patent

UNITED STATES PATENTS

| Number | Name | Date |
|---|---|---|
| 1,111,365 | Creighton | Sept. 22, 1914 |
| 1,350,300 | Crumpton | Aug. 24, 1920 |
| 2,046,436 | Wascheck | July 7, 1936 |
| 2,278,506 | Zuschlag | Apr. 7, 1942 |
| 2,314,873 | Evjen | Mar. 30, 1943 |
| 2,342,627 | Evjen et al. | Feb. 29, 1944 |

FOREIGN PATENTS

| Number | Country | Date |
|---|---|---|
| 407,780 | Great Britain | Mar. 29, 1934 |